US009162352B2

(12) United States Patent
Rudolf et al.

(10) Patent No.: US 9,162,352 B2
(45) Date of Patent: Oct. 20, 2015

(54) HAND-GUIDED APPARATUS WITH AN OPERATING LEVER

(75) Inventors: Peter Rudolf, Senden (DE); Martin Lugert, Günzburg (DE); Runo Malkolmsson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 668 days.

(21) Appl. No.: 13/416,051

(22) Filed: Mar. 9, 2012

(65) Prior Publication Data

US 2013/0140051 A1 Jun. 6, 2013

(30) Foreign Application Priority Data

Dec. 6, 2011 (DE) ..................... 20 2011 108 753 U

(51) Int. Cl.

*B23B 45/00* (2006.01)
*B25F 5/00* (2006.01)
*B27B 9/00* (2006.01)
*B27B 17/00* (2006.01)
*B27B 17/08* (2006.01)

(52) U.S. Cl.

CPC ... *B25F 5/00* (2013.01); *B27B 9/00* (2013.01); *B27B 17/00* (2013.01); *B27B 17/083* (2013.01)

(58) Field of Classification Search

CPC ............... H01H 9/26; B25F 5/00; B25F 5/02; B25F 3/00
USPC .............. 173/1-11, 13, 18-19, 141-161, 170
See application file for complete search history.

(56) References Cited

U.S. PATENT DOCUMENTS

| | | | | |
|---|---|---|---|---|
| 3,746,813 | A * | 7/1973 | Brown | 200/43.17 |
| 3,847,233 | A * | 11/1974 | Glover et al. | 173/170 |
| 4,040,554 | A * | 8/1977 | Haytayan | 227/8 |
| 4,125,850 | A * | 11/1978 | Fujita et al. | 396/302 |
| 4,520,686 | A * | 6/1985 | Renk | 74/473.1 |
| 4,646,982 | A * | 3/1987 | Spring | 242/484.8 |
| 5,076,411 | A * | 12/1991 | Kramer et al. | 192/131 R |
| 6,878,888 | B1 | 4/2005 | Jong | |

(Continued)

FOREIGN PATENT DOCUMENTS

DE 3006405 A1 8/1981

OTHER PUBLICATIONS

German Search Report of DE 202011108753.4 mailed Jul. 30, 2012.

*Primary Examiner* — Robert Long
(74) *Attorney, Agent, or Firm* — Nelson Mullins Riley & Scarborough LLP

(57) ABSTRACT

A hand-guided apparatus may include an operating lever, a switch, and an intermediate lever. The operating lever may actuate a function of the hand-guided apparatus, be constructed in an elongated manner and be pivotably attached to a housing of the apparatus. The switch actuates the function and is arranged in the housing. The intermediate lever mechanically actuates the switch. The operating lever includes a safety element enabled to be pretensioned and shifted along a longitudinal axis of the operating lever. The operating lever and the intermediate lever are enabled to be mechanically coupled by shifting the safety element into a pretensioned state to enable actuation of the switch by pivoting of the operating lever. The operating lever and the intermediate lever are enabled to be mechanically decoupled by shifting the safety element into a relaxed state to prevent actuation of the switch by pivoting of the operating lever.

12 Claims, 5 Drawing Sheets

(56) References Cited

U.S. PATENT DOCUMENTS

Figure 1:
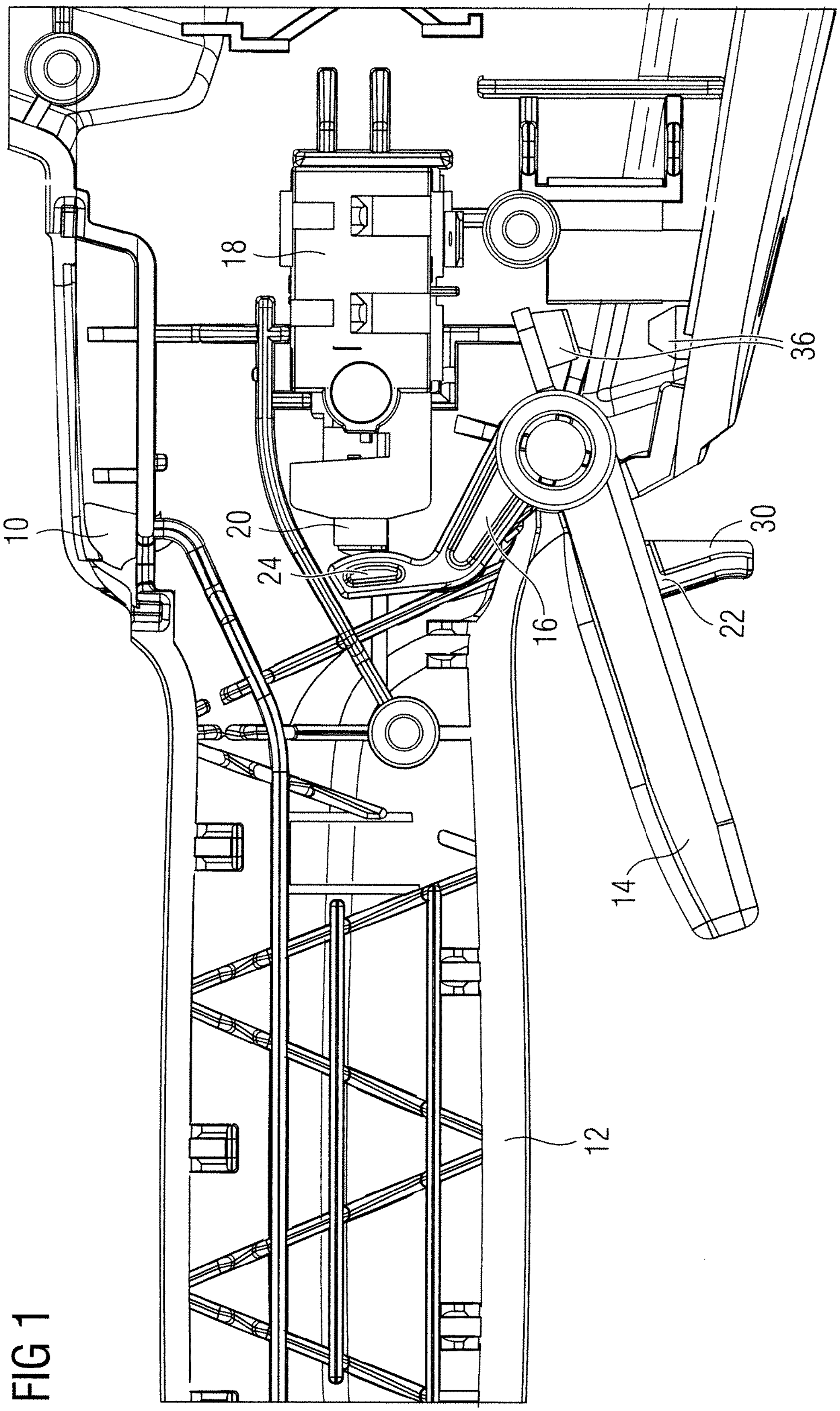

| | | | | |
|---|---|---|---|---|
| 6,909,061 | B1 | 6/2005 | Jong | |
| 7,513,402 | B2 * | 4/2009 | Miyashita et al. | 227/8 |
| 7,571,840 | B2 * | 8/2009 | Chen et al. | 227/8 |
| 2003/0037937 | A1 * | 2/2003 | Frauhammer et al. | 173/48 |
| 2004/0201288 | A1 * | 10/2004 | Harvey et al. | 307/327 |
| 2008/0048374 | A1 * | 2/2008 | Geier et al. | 269/225 |
| 2010/0084151 | A1 * | 4/2010 | Kuhnle et al. | 173/47 |
| 2010/0102102 | A1 * | 4/2010 | Matsunaga et al. | 227/8 |
| 2010/0116863 | A1 * | 5/2010 | Suda | 227/8 |
| 2011/0057014 | A1 * | 3/2011 | Yang et al. | 227/8 |
| 2011/0062207 | A1 * | 3/2011 | Hlinka et al. | 227/8 |
| 2011/0062210 | A1 * | 3/2011 | Leung | 227/120 |
| 2011/0132959 | A1 * | 6/2011 | Hlinka et al. | 227/8 |
| 2011/0297723 | A1 * | 12/2011 | Marusich | 227/63 |
| 2011/0308920 | A1 * | 12/2011 | Shi et al. | 200/43.17 |
| 2012/0048585 | A1 * | 3/2012 | Miyazawa et al. | 173/170 |
| 2013/0161161 | A1 * | 6/2013 | Parrinello et al. | 200/43.17 |
| 2013/0341169 | A1 * | 12/2013 | Kuhnle et al. | 200/337 |
| 2014/0008091 | A1 * | 1/2014 | Kouguchi | 173/213 |

* cited by examiner

HAND-GUIDED APPARATUS WITH AN OPERATING LEVER

CROSS REFERENCE TO RELATED APPLICATIONS

This application claims priority to and the benefit of DE202011108753.4, filed Dec. 6, 2011, the contents of which are incorporated herein in their entirety.

TECHNICAL FIELD

Example embodiments generally relate to a hand-guided apparatus with an operating lever.

BACKGROUND

A hand-held apparatus with an operating lever customarily comprises one or more safety elements so that the operating lever can only be actuated by a previous or a simultaneous movement of the safety element. It should be prevented in this manner that the apparatus is inadvertently turned on. Such a safety element is especially required for electrical tools in order to avoid the danger of injuring a user. There are numerous different systems for safety elements in hand-guided apparatuses.

For example, two safety elements can be provided, where the first safety element actuates the second safety element in order to release the operating lever. Usually, these safety elements are actuated in the same direction. However, this constellation is increasingly prohibited for electrically operated apparatuses.

Furthermore, two safety elements can be provided that require a recess or a milled-out area in the handle or the housing of the apparatus. However, this reduces the stability of the handle or of the housing.

BRIEF SUMMARY OF SOME EXAMPLES

Some example embodiments have the basic task of making available a hand-guided apparatus with an operating lever and an improved safety element.

According to an example embodiment, a hand-guided apparatus is provided with at least one operating lever for actuating at least one function of the hand-guided apparatus, whereby

- the operating lever is constructed in an elongated manner and is pivotably attached to a housing of the hand-guided apparatus,
- at least one switch for actuating the function is arranged in the housing,
- at least one pivotable intermediate lever for mechanically actuating the switch is arranged in the housing,
- the operating lever comprises a safety element that can be pretensioned and shifted along the longitudinal axis of the operating lever,
- the operating lever and the intermediate lever can be mechanically coupled by shifting the safety element into a pretensioned state,
- so that the switch can be actuated by the pivoting of the operating lever, and
- the operating lever and the intermediate lever can be mechanically decoupled by shifting the safety element into a relaxed state,
- so that the actuation of the switch is prevented by the pivoting of the operating lever.

One aspect of some embodiments is the safety element, that can be pretensioned and that forms a part of the operating lever. As a result thereof, no separate opening is required in the housing for the safety element. The safety element does not have to be constructed as a separate switch. In the decoupled state the operating lever can not be overloaded. The actuations of the operating lever and of the safety element take place by movements in different directions, which corresponds to the safety standards. The operating lever with the safety element can be made available as a pre-mounted structural group so that the manufacture of the hand-guided apparatus is facilitated.

A main part of the safety element is preferably arranged inside the operating lever in a shiftable manner. This makes possible a compact manner of construction of the operating lever with the safety element.

Furthermore, an actuation part of the safety element can extend outward through a slot in the operating lever so that the safety element can be manually shifted by the actuation part.

An elastic element is preferably arranged in the operating lever by means of which the safety element can be pretensioned. The elastic element is, for example, a spiral spring.

In some cases, the intermediate lever is constructed as a two-armed lever, whereby a first lever arm is provided for actuating the switch and a second lever arm is provided for the coupling to the safety element.

According to another example embodiment, a hand-guided apparatus is provided with at least one operating lever for actuating at least one function of the hand-guided apparatus, whereby

- the operating lever is constructed in an elongated manner and is pivotably attached to a housing of the hand-guided apparatus,
- at least one switch for actuating the function is arranged in the housing,
- at least one pivotable intermediate lever for mechanically actuating the switch is arranged in the housing,
- the operating lever can be shifted along its axis of pivoting or its longitudinal axis,
- the operating lever and the intermediate lever can be mechanically coupled by shifting the operating lever into a pretensioned state,
- so that the switch can be actuated by the pivoting of the operating lever, and
- the operating lever and the intermediate lever can be mechanically decoupled by shifting the operating lever into a relaxed state,
- so that the actuation of the switch is prevented by the pivoting of the operating lever.

One aspect of an example embodiment is the operating lever that can be pretensioned. As a result thereof, no safety element and therefore also no separate opening in the housing for the safety element are required. The operating lever can not be overloaded in the decoupled state. The releasing and the actuation of the operating lever take place by movements in different directions, which corresponds to the safety standards.

In some cases, an elastic element is arranged in the housing with which element the operating lever can be pretensioned along its pivot axis or longitudinal axis.

For example, the intermediate lever is constructed as a one-armed lever and the lever arm is provided for actuating the switch.

In some cases, the operating lever and the intermediate lever have a common pivot axis.

Further features, especially embodiments and advantages of the invention are subject matter of the subclaims.

BRIEF DESCRIPTION OF THE SEVERAL VIEWS OF THE DRAWING(S)

Figure 2:
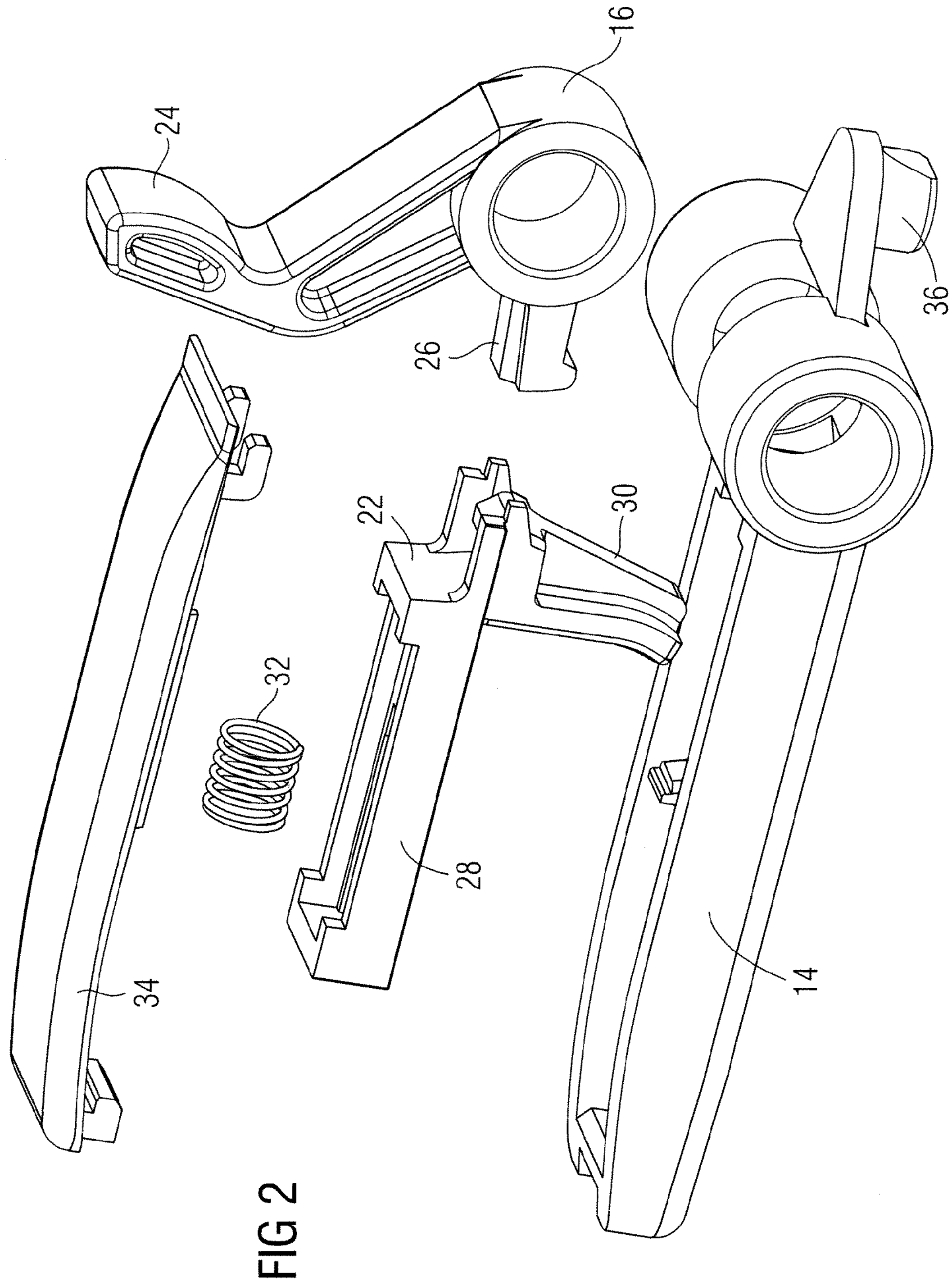
Figure 3:
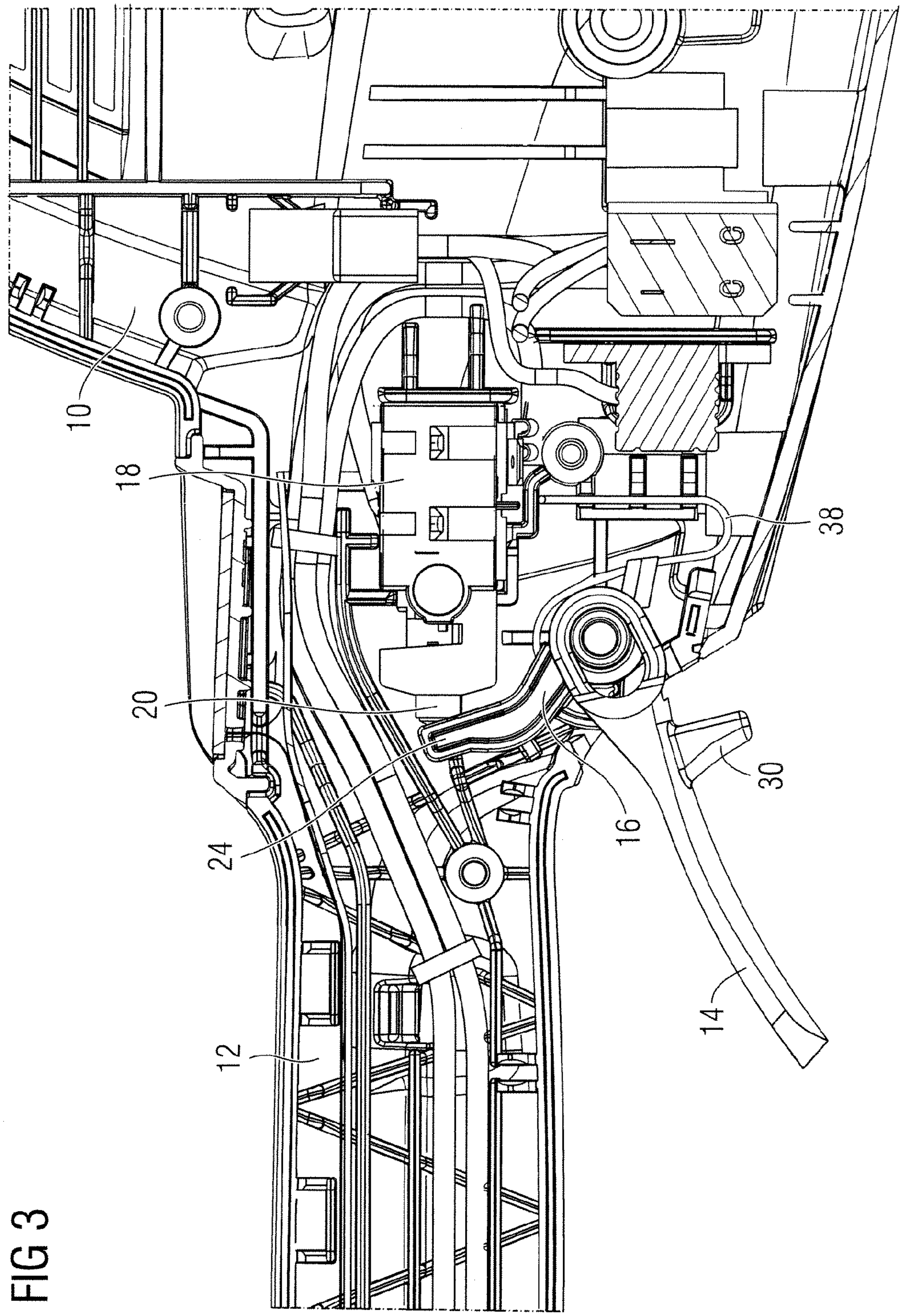
Figure 4:
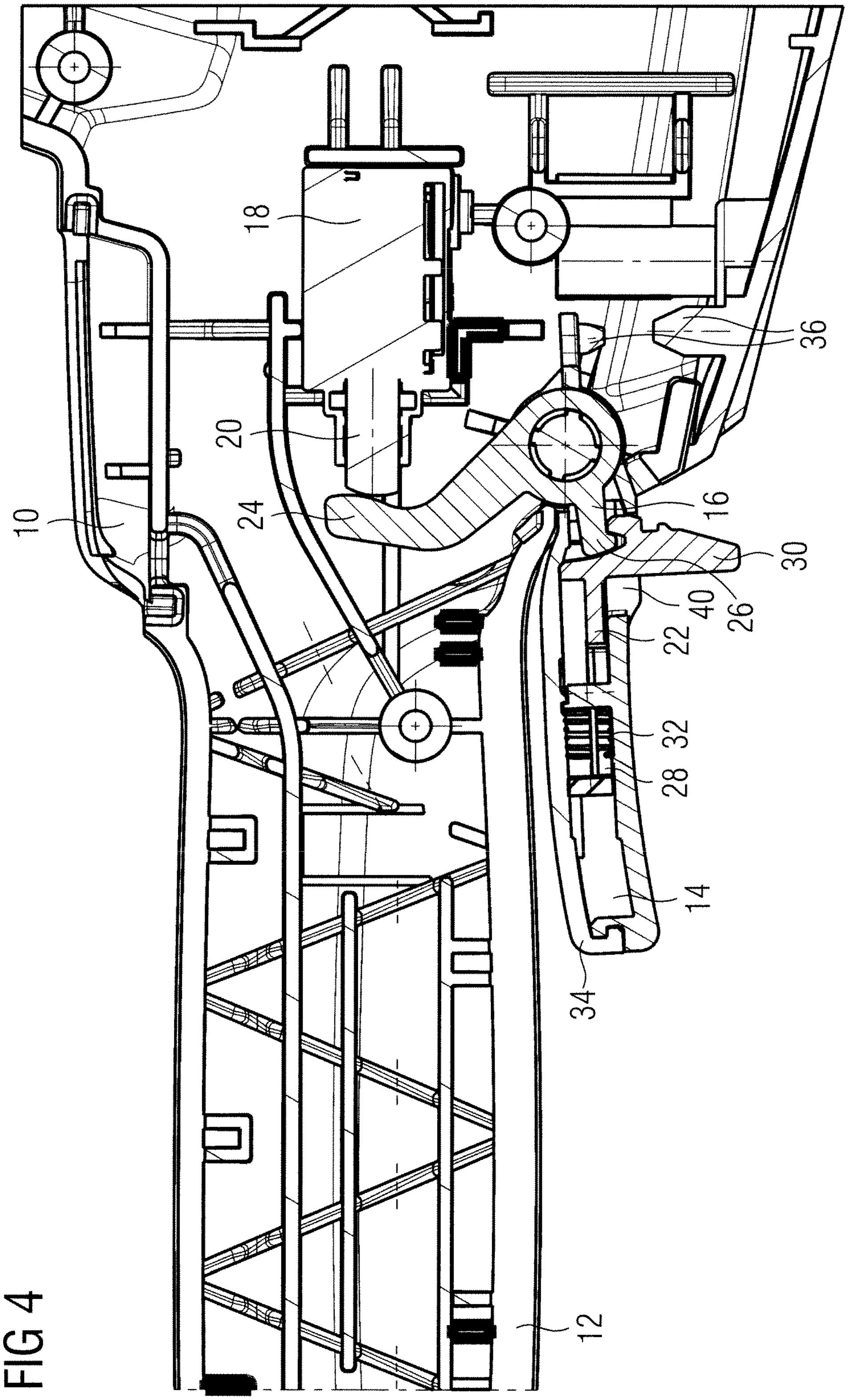
Figure 5:
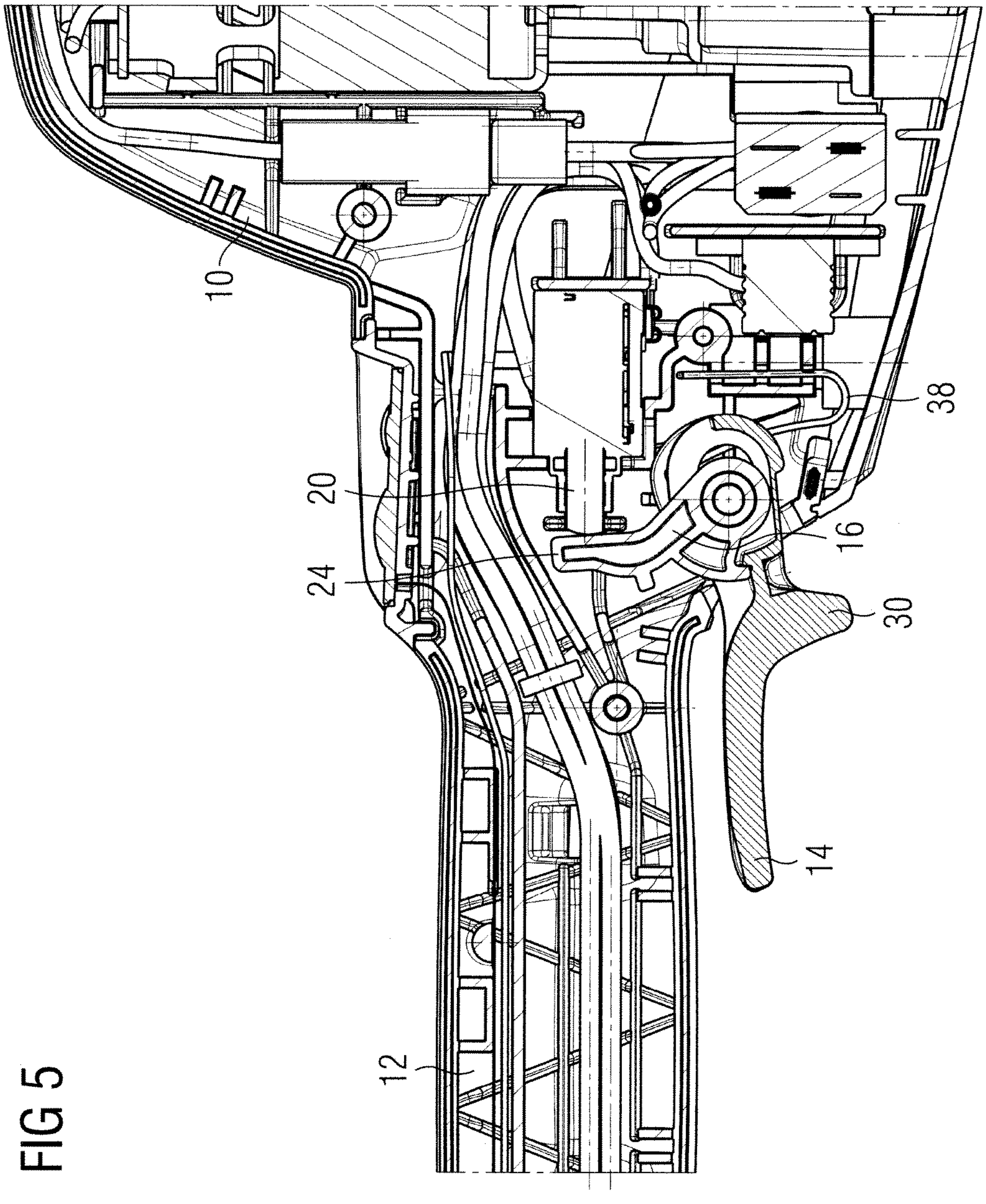

The invention is explained in detail using some exemplary embodiments and with reference made to the attached drawings, in which:

FIG. 1 shows a schematic lateral partial view in section of the hand-guided apparatus according to a first example embodiment of the invention, FIG. 2 shows a schematic exploded view of an operating lever and of an intermediate lever for the hand-guided apparatus in accordance with the first example embodiment of the invention, FIG. 3 shows a schematic lateral partial view in section of the hand-guided apparatus according to a second example embodiment of the invention, FIG. 4 shows another schematic lateral partial view in section of the hand-guided apparatus according to the first example embodiment of the invention, and FIG. 5 shows another schematic lateral partial view in section of the hand-guided apparatus according to the second example embodiment of the invention.

DETAILED DESCRIPTION

FIG. 1 shows a schematic lateral partial view in section of the hand-guided apparatus according to a first embodiment of the invention. The hand-guided apparatus comprises a housing 10 with an elongated handle 12. In this example the housing 10 and the handle 12 are constructed in one piece. Furthermore, an intermediate lever 16 and a switch are located in the housing 10. An elongated operating lever 14 is pivotably attached to the housing 10. The larger part of the operating lever 14 is located outside of the housing 10. The operating lever 14 is arranged parallel to the handle 12 or forms an acute angle with it according to the state of pivoting.

The switch 18 is located in the area of the housing 10, to which the handle 12 is attached or into which the handle 12 empties. The switch 18 has a key 20 that can be actuated by pressing along the longitudinal axis of the handle 12. In this embodiment the switch 18 is designed as an electrical switch. For example, the switch 18 can also be provided as a valve for liquids or gases.

A safety element 22 is located on the operating lever 14. The safety element 22 is constructed in one piece and comprises a main part 28 (FIG. 2) and an actuating part 30. The main part 28 of the safety element 22 is constructed in an elongated manner and is located inside the hollow operating lever 14. The main part 28 can be shifted along its longitudinal axis inside the operating lever 14. The actuating part 30 of the safety element 22 is located outside of the operating lever 14 and extends through a slot 40 that extends along the longitudinal axis of the operating lever 14. Thus, a user can shift the safety element 22 inside of the operating lever 14 by moving the actuating part 30.

The intermediate lever 16 is pivotably attached in the housing 10. The intermediate lever 16 is a two-armed lever and is constructed in an approximate L-shape. A first lever arm 24 is provided for actuating the key 20 on switch 18. A second lever arm 26 (FIG. 2) is actuated by a pivoting movement of the operating lever 14 so that the intermediate lever 16 itself executes a pivoting movement and the key 20 on switch 18 is pressed.

The coupling between the operating lever 14 and the second lever arm 26 of the intermediate lever 16 takes place by the safety element 22. By shifting the safety element 22 inside the operating lever 14, the second lever arm 26 can be coupled to and decoupled from the safety element 22 and therewith to and from operating lever 14.

By shifting the safety element 22 toward the pivot axis of the operating lever 14 the second lever arm 26 lies on the safety element 22. As a result, upon a pivoting movement of the operating lever 14 toward the handle 12 even the intermediate lever 16 is pivoted in such a manner that the key 20 on the switch 18 is pressed.

On the other hand, if the safety element 22 is located on the end of the operating lever 14, that is arranged opposite the pivot axis of the operating lever 14, then upon a pivoting movement of the operating lever 14 toward the handle 12 the intermediate lever 16 is not moved. An elastic element 32 (FIG. 2) is provided that presses the safety element 22 onto the end of the operating lever 14, that is arranged opposite the pivot axis of the operating lever 14. Thus, the force of the elastic element 32 must be overcome in order to push the safety element 22 toward the pivot axis and as a result to make possible the coupling between the operating lever 14 and the intermediate lever 16.

Moreover, the housing 10 and the operating lever 14 each have a projection 36. The projections 36 are arranged oppositely and are provided for receiving another elastic element, in particular a spiral spring. This other elastic element brings it about that the operating lever 14 is pressed away from the handle 12. In order to actuate the switch 18 the user must therefore pull the operating lever 14 against the action of this elastic element toward the handle 12.

If the actuating part 30 of the safety element 22 is pushed to the right in FIG. 1 and the operating lever 14 is pivoted clockwise, then the intermediate lever 16 is also pivoted clockwise and the first lever arm 24 actuates the key 20 on the switch 18.

FIG. 2 shows a schematic exploded view of the operating lever 14 and of the intermediate lever 16 for the hand-guided apparatus in accordance with the first embodiment of the invention. FIG. 2 shows the arrangement of the safety element 22 in the operating lever 14 and relative to the intermediate lever 16.

The cross section of the inner space in the operating lever 14 is slightly larger than the cross section of the main part 28 of the safety element 22, so that the safety element 22 can be reliably shifted along the longitudinal axis of operating lever 14.

The elastic element is designed as spiral spring 32, that is arranged inside the operating lever 14 as well as inside the main part 28 of the safety element 22. The spiral spring 32 brings it about that the main part 28 of the safety element 22 and the intermediate lever 16 are decoupled. The safety element 22 is pressed to the left here by the spiral spring in FIG. 2. In order to actuate the switch 18 the user must therefore move the safety element 22 against the action of the spiral spring 32 and pull the operating lever 14 toward the handle 12.

In this example the operating lever 14 and the intermediate lever 16 have a common pivot axis. Alternatively, the operating lever 14 and the intermediate lever 16 can also have separate pivot axes.

FIG. 3 shows a schematic lateral view in partial section of the hand-guided apparatus in accordance with a second embodiment of the invention. The same components and components with the same function have the same reference numerals as in the first embodiment.

The hand-guided apparatus of the second embodiment also comprises the housing 10 with the elongated handle 12 that are constructed in one piece. The intermediate lever 16 and the switch 18 are located in the housing 10. The elongated operating lever 14 is pivotably attached to the housing 10, whereby the larger part of the operating lever 14 is located outside of the housing 10. The operating lever 14 is arranged parallel to the handle 12 or forms an acute angle with it depending on the pivoting state.

The switch 18 is located in the area of the housing 10 to which the handle 12 is attached or into which the handle 12 empties. The switch 18 comprises the key 20 that can be actuated by pressing on the longitudinal axis of the handle 12. Even this switch 18 is constructed as an electric switch, whereby instead of the electric switch a valve for liquids or gases can also be provided.

The intermediate lever 16 is pivotably attached in the housing 10 and constructed as a one-armed lever. The lever arm 24 is provided for actuating the key 20 on the switch 18. The lever arm 24 is actuated by a pivoting motion of the operating lever 14 so that the key 20 on the switch 18 is pressed.

In the second embodiment there are two possibilities for the coupling and decoupling between the operating lever 14 and the intermediate lever 16. The coupling and decoupling are brought about by a shifting of the operating lever 14 either along its longitudinal axis or its pivot axis. In addition, there is the possibility of coupling and decoupling between the lever arm 24 of the intermediate lever 16 and the key 20 of the switch 18. In the latter instance the operating lever 14 and the intermediate lever 16 are constructed singly or in one piece and the coupling and decoupling take place by the shifting of the operating lever 14 and the intermediate lever 16 about their common pivot axis.

The one possibility for the coupling and decoupling of operating lever 14 and intermediate lever 16 can take place by shifting the operating lever 14 along its longitudinal axis. FIG. 3 shows the decoupled state between operating lever 14 and intermediate lever 16 while the coupled state between the operating lever 14 and the intermediate lever 16 is not shown. If the operating lever 14 is pushed along its longitudinal axis in the direction of housing 10 and intermediate lever 16, the mechanical coupling between the operating lever 14 and the intermediate lever 16 takes place so that the switch 18 can be actuated by the pivoting motion of the operating lever 14. If the operating lever 14 is withdrawn along its longitudinal axis from the housing 10 and the intermediate lever 16, the mechanical decoupling between the operating lever 14 and the intermediate lever 16 takes place in such a manner that the intermediate lever 16 is not entrained by the pivoting motion of the operating lever 14 and as a result the switch 18 can not be actuated.

The other possibility for the coupling and decoupling between the operating lever 14 and the intermediate lever 16 and key 20 of the switch 18 takes place by an axial movement of the operating lever 14 along its pivot axis, i.e., vertically to the drawing plane of FIG. 3. This shifts the operating lever 14 in the lateral direction. If the operating lever 14 and the intermediate lever 16 are constructed in one piece with the lever arm 24 lever arm 24 would move past the key 20 in the decoupled state during the pivoting of the operating lever 14 so that the decoupling between the lever arm 24 and the key 20 takes place. On the other hand, if the operating lever 14 and the intermediate lever 16 with the lever arm 24 are constructed as separate parts, then the intermediate lever 16 for the lever arm 24 would not be entrained in the decoupled state during the pivoting of the operating lever 14, so that the decoupling between operating lever 14 and the intermediate lever 16 takes place. An elastic element 38 is provided that counteracts the coupling between operating lever 14 and the intermediate lever 16 or between operating lever 14 with intermediate lever 16 and the key 20.

In order to actuate the switch 18 the user must therefore push the operating lever 14 axially along its pivot axis and subsequently pull it towards the handle 12.

In the described embodiments the user merely has to move the operating lever 14 in FIG. 3 or the safety element 22 in FIG. 2 forward, i.e., in the direction of the longitudinal axis of the operating lever 14 in order to actuate the cutting-in mechanism. As described above, the cutting-in mechanism can be alternately activated by shifting the operating lever 14 in the lateral direction. If the operating lever 14 is subsequently pulled to the handle 12, no expenditure of force in the direction of the operating lever 14 is required. Otherwise, this would make the work more difficult for the user.

In FIG. 3 the intermediate lever 16 and the operating lever 14 are connected to one another by a small hook on the second lever arm 26. In a similar manner, in FIG. 2 the intermediate lever 16 and the safety element 22 are connected to one another by the small hook on the second lever arm 26. The force for actuating the switch 18 causes a friction between the second lever arm 26 and the safety element 22 and between the operating lever 14 and the intermediate lever 16. When the operating lever 14 is released, in FIG. 3 the operating lever 14 itself jumps back and in FIG. 2 the safety element 22 jumps back.

FIG. 4 shows another schematic lateral view in partial section of the hand-guided apparatus in accordance with the first embodiment of the invention. The hand-guided apparatus comprises the housing 10 with the handle 12, the operating lever 14, the safety element 22 with the main part 28 and with the actuating part 30, comprises the intermediate lever 16 with the first lever arm 24 and with the second lever arm 26, comprises the switch 18 with the key 20 and comprises the two projections 36. The actuating part 30 and with the second lever arm 26, comprises the switch 18 with the key 20 and comprises the two projections 36. The actuating part 30 extends through the slot 40, that extends along the longitudinal axis of the operating lever 14. The user can push the safety element 22 inside the operating lever 14 by moving the actuating part 30.

In contrast to FIG. 1, FIG. 4 shows the interior of the operating lever 14. The spiral spring 32 brings it about that the safety element 22 and main part 28 and actuating part 30 are pressed to the left in FIG. 4. In order to actuate the switch 18 the user must move the safety element 22 against the force of the spiral spring 32 with the actuating part 30 and pull the operating lever 14 toward the handle 12, during which the actuating part 30 is shifted inside the slot 40.

In particular, FIG. 4 shows the coupling between the safety element 22 and the second lever arm 26 in detail. The safety element 22 and the second lever arm 26 are constructed complementary to one another in sections at the coupling point, so that in the coupled state the safety element 22 and the second lever arm 26 are engaged. In this example the safety element 22 and the second lever arm 26 each have a projection and an undercut.

FIG. 5 shows another schematic, lateral view in partial section of the hand-guided apparatus in accordance with the second embodiment of the invention. In this example the operating lever 14 and the intermediate lever 16 are constructed as separate parts, whereby the coupling and the decoupling take place between the operating lever 14 and the intermediate lever 16.

FIG. 5 also shows the coupling between the operating lever 14 and the intermediate lever 16 in detail. The operating lever 14 and the intermediate lever 16 are constructed complementary to one another in sections at the coupling point so that in the coupled state the operating lever 14 and the intermediate lever 16 are engaged. Even in this example the operating lever 14 and the intermediate lever 16 each have a projection and an undercut.

In particular, the hand-guided apparatus can be an electrical tool. An electrical hedge cutter, an electrical chain saw or a manual circular saw are cited as examples. Likewise, the hand-guided apparatus can be an injection device in which the switch 18 is designed as a valve.

That which is claimed:

1. A hand-guided apparatus comprising:

at least one operating lever for actuating at least one cutting member of the hand-guided apparatus, the operating lever being constructed in an elongated manner and being pivotably attached to a housing of the hand-guided apparatus;

at least one switch arranged in the housing for actuating the cutting member; and at least one pivotable intermediate lever arranged in the housing for mechanically actuating the switch, wherein the operating lever comprises a safety element that is enabled to be pretensioned and shifted along a longitudinal axis of the operating lever, the operating lever and the intermediate lever are enabled to be mechanically coupled, so that movement of the operating lever causes movement of the intermediate lever, by shifting the safety element into a pretensioned state to enable actuation of the switch by pivoting of the operating lever, and the operating lever and the intermediate lever are enabled to be mechanically decoupled, so that movement of the operating lever does not cause movement of the intermediate lever, by shifting the safety element into a relaxed state to prevent actuation of the switch by the pivoting of the operating lever.

2. The hand-guided apparatus according to claim 1, wherein a main part of the safety element is arranged inside the operating lever and is shiftable.

3. The hand-guided apparatus according to claim 1, wherein an actuating part of the safety element extends outside of the operating lever through a slot in the operating lever to enable manual shifting of the safety element by the actuating part.

4. The hand-guided apparatus according to claim 1, wherein an elastic element is arranged in the operating lever with which the safety element is pretensionable.

5. The hand-guided apparatus according to claim 4, wherein the elastic element is a spiral spring.

6. The hand-guided apparatus according to claim 1, wherein the intermediate lever is constructed as a two-armed lever, and wherein a first lever arm is provided for actuating the switch and a second lever arm is provided for coupling to the safety element.

7. A hand-guided apparatus comprising:

at least one operating lever for actuating at least one cutting member of the hand-guided apparatus, the operating lever being constructed in an elongated manner and being pivotably attached to a housing of the hand-guided apparatus;

at least one switch arranged in the housing for actuating the cutting member; and at least one pivotable intermediate lever arranged in the housing for mechanically actuating the switch, wherein the operating lever is enabled to be shifted along its pivot axis or longitudinal axis, the operating lever and the intermediate lever are enabled to be mechanically coupled, so that movement of the operating lever necessitates movement of the intermediate lever, by shifting the operating lever into a pretensioned state to enable actuation of the switch by pivoting of the operating lever, and the operating lever and the intermediate lever are enabled to be mechanically decoupled, so that movement of the operating lever does not necessitate movement of the intermediate lever, by shifting the safety element into a relaxed state to prevent actuation of the switch by the pivoting of the operating lever.

8. The hand-guided apparatus according to claim 7, wherein an elastic element is arranged in the housing to enable the operating lever to be pretensioned along its pivot axis or longitudinal axis.

9. The hand-guided apparatus according to claim 7, wherein the intermediate lever is constructed as a one-armed lever and a lever arm is provided for actuating the switch.

10. The hand-guided apparatus according to claim 7, wherein the operating lever and the intermediate lever have a common pivot axis.

11. The hand-guided apparatus according to claim 1, wherein the safety element is shifted into the pretensioned state by an operator's hand.

12. The hand-guided apparatus according to claim 1, wherein the operating lever and intermediate lever share a pivot point located within the housing.

* * * * *